(12) United States Patent
Karins, Sr.

(10) Patent No.: US 10,299,591 B1
(45) Date of Patent: *May 28, 2019

(54) CORNER SHELF INSTALLATION TOOL

(71) Applicant: William Joseph Karins, Sr., Sarasota, FL (US)

(72) Inventor: William Joseph Karins, Sr., Sarasota, FL (US)

(73) Assignee: William Joseph Karins, Sr., Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/245,455

(22) Filed: Jan. 11, 2019

Related U.S. Application Data (63) Continuation of application No. 16/021,212, filed on Jun. 28, 2018, now Pat. No. 10,213,018.

(51) Int. Cl.
*A47B 96/07* (2006.01)
*A47B 96/02* (2006.01)
(Continued)

(52) U.S. Cl.
CPC ............ *A47B 96/07* (2013.01); *A47B 96/022* (2013.01); *A47K 3/281* (2013.01); *F16M 13/025* (2013.01); *A47K 2201/02* (2013.01)

(58) Field of Classification Search
CPC ........ A47K 3/281; A47K 3/282; A47K 3/283; A47K 2201/02; A47B 96/022; A47B 96/021; A47B 96/02; A47B 96/025; A47B 96/027; A47B 96/028; A47B 96/062; A47B 96/063; A47B 96/065; A47B 96/07; A47B 96/067; A47B 96/06; A47B 96/1425; A47B 96/024; A47B 45/00; A47B 96/066; A47B 96/00; A47B 96/061; A47B 57/42; A47B 57/52; A47B 57/56; A47B 57/567; A47B 57/46; A47B 57/045; A47B 57/06; A47B 57/30; A47B 57/54; A47B 2220/0038; A47B 2220/0036; A47B 2220/0041;
(Continued)

(56) References Cited

U.S. PATENT DOCUMENTS

150,230 A    4/1874  Brayton
814,811 A    3/1906  Speed
(Continued)

*Primary Examiner* — Hiwot E Tefera
(74) *Attorney, Agent, or Firm* — Shumaker, Loop & Kendrick, LLP (57) ABSTRACT

Disclosed is a shower corner shelf installation tool that includes a first and second arm that are pivotally connected to one other and are configured to support a shower corner shelf thereon when the shower corner shelf installation tool is in use, the first and second arms each have an upper sidewall connected to a lower sidewall by an outer sidewall positioned there between; anchor members protruding from the outer side wall of each arm that are configured to grip a shower corner to temporarily affix the shower corner shelf installation tool thereto while in use; leveling members extending above the first and second arm that are independently configured to selectively adjust the shower corner shelf during installation; and a tensioning member configured to extend between the first and second arm and apply force to the first and second arms and anchor members while the shower corner shelf installation tool is in use to temporarily affix the shower corner shelf installation tool to shower corner.

19 Claims, 9 Drawing Sheets

(51) Int. Cl.
*A47K 3/28* (2006.01)
*F16M 13/02* (2006.01)

(58) Field of Classification Search
CPC . A47B 2005/003; A47B 47/00; A47B 47/021;
A47B 47/022; A47B 96/068; A47B 5/00;
A47B 5/04; F16B 7/06; F16M 13/025;
D06F 57/12; A47C 15/002; A47G 7/041;
A47F 5/0043; A47F 5/08
USPC .... 211/90.01, 119.009, 119.011, 90.02, 193;
248/220.1, 250, 245; 108/42; 403/150,
403/43–48, 102, 122
See application file for complete search history.

(56) References Cited

U.S. PATENT DOCUMENTS

| | | |
|---|---|---|
| 1,024,997 A | 4/1912 | Longworth |
| 1,159,813 A | 11/1915 | Volkhardt |
| 1,169,056 A | 1/1916 | Freirich |
| 1,189,988 A | 7/1916 | Moody |
| 1,286,588 A | 12/1918 | Goodykoontz |
| 1,325,143 A | 12/1919 | Conterio |
| 1,636,185 A | 7/1927 | Goodwin |
| 2,483,758 A | 10/1949 | Douglas |
| 4,555,082 A | 11/1985 | Sack et al. |
| 4,927,107 A | 5/1990 | Mateo Maria |
| 5,513,575 A | 5/1996 | Slade |
| 8,998,008 B1 | 4/2015 | Robertson |
| 9,439,510 B2 | 9/2016 | Karins, Sr. |
| 9,526,337 B2 | 12/2016 | Karins, Sr. |
| 2011/0168859 A1 | 7/2011 | Baruch |
| 2013/0161329 A1 | 6/2013 | Baines |
| 2014/0197119 A1 | 7/2014 | Stenhouse |

CORNER SHELF INSTALLATION TOOL

TECHNICAL FIELD

The present invention relates generally to the field of shelf assemblies, and more particularly, to tools and kits for shower corner shelf installation.

BACKGROUND

As discussed in U.S. Pat. Nos. 9,439,510 and 9,526,337, over the past two decades, residential bathrooms have become increasingly more elaborate, lavish, and luxurious. In most high-end bathrooms, custom fixtures, custom made sinks, custom showers, custom baths, and custom wall and shower tile have become commonplace in residential homes and luxury hotels. For example, in most of these high-end custom bathrooms, showers utilize custom tile, including but not limited to, marble, granite, ceramic, and travertine. In these custom showers, corner shelves have also become increasingly popular to place shampoos, soap, and other toiletries inside the shower in lieu of alternative options such as shower caddies. These corner shelves advantageously provide the functional utility of storing items within the shower while concurrently being aesthetically pleasing.

As discussed in U.S. Pat. Nos. 9,439,510 and 9,526,337, corner shelves typically have two different, conventional modes of installation. A first mode of installation includes framing a corner shelf area using lumber, which is subsequently covered with sheet rock. After hanging sheet rock within the shower area, and over the corner shelf area, decorative tile or stone is subsequently placed within the shower and forms both the shower area and the corner shelf. However, this method of forming a corner shelf within a shower is complex and time consuming. Also, these types of shower corner shelves are often susceptible to water damage and deterioration because water often penetrates through holes in the grout if the grouting is not constantly maintained. A second mode of installation includes, installing a pre-formed corner shelf within an existing shower corner. In order to install the pre-formed shower corner shelf within a pre-existing shower corner, a tile saw must first be used to cut and remove a portion of the tile that forms a groove/channel/recess capable of receiving complimentary protrusions from the pre-formed corner shelf. For example, when installing shelf, an adhesive is applied to the pre-formed shelf's protrusions, which are then pressed in and adhered to the groove/channel until the shelf is fixed to the shower corner. After installation, grout may be applied around the edges of the shelf to prevent water from leaking into the wall immediately behind shelf and the shower tile. After installation, the shelf can be used for toiletry storage.

Each of the above mentioned shelf installation methods are complex, laborious, and time consuming. U.S. Pat. Nos. 9,439,510 and 9,526,337 addressed these issues by providing alternative, more efficient methods and assemblies for retrofit shower corner shelf installation. However, a need remains for additional more efficient methods and assemblies for retrofit shower corner shelf installation including specialized tool(s) that further facilitate these alternative methods.

BRIEF SUMMARY

Disclosed is a shower corner shelf installation tool including a first and second arm that are pivotally connected to one other and are configured to support a shower corner shelf thereon when the shower corner shelf installation tool is in use, the first and second arms each have an upper sidewall connected to a lower sidewall by an outer sidewall positioned there between; spaced apart anchor members protruding away from the outer side wall of each arm that are configured to grip a shower corner to temporarily affix the shower corner shelf installation tool thereto while in use; spaced apart leveling members extending above the first and second arm that are independently configured to selectively adjust the shower corner shelf during installation; and a tensioning member configured to extend between the first and second arm and to apply force to the first and second arms and anchor members while the shower corner shelf installation tool is in use to temporarily affix the shower corner shelf installation tool to the shower corner.

In certain aspects, the tensioning member is adjustable in length to selectively apply force to the first and second arms.

In certain aspects, the tensioning member is a turnbuckle having one end pivotally attached to the first arm and a second end configured to move towards the second arm and to be temporarily received within a catch member of the second arm when the turnbuckle is deployed, the turnbuckle configured to adjust in length while deployed to concurrently, selectively apply force to the first and second arms and anchor members while the shower corner shelf installation tool is in use to temporarily affix the shower corner shelf installation tool to the shower corner.

In certain aspects, the first arm has a channel formed between the upper, lower, and outer sidewalls that is configured to receive the turnbuckle therein when the turnbuckle is in a stowed position.

In certain aspects, the leveling members are adjacent to the anchor members.

In certain aspects, the leveling members extend through and are selectively adjustable above and below the upper and lower sidewalls of the first and second arms.

In certain aspects, the leveling members are transversely oriented within the upper and lower sidewalls relative to the anchor members.

In certain aspects the first and second arms are pivotally connected to one another by a hinge.

Also disclosed is a shower corner shelf installation kit including (a) a shower corner shelf; and (b) a shower corner shelf installation tool. The shower corner shelf installation tool includes (i) a first and second arm that are pivotally connected to one other and are configured to support a shower corner shelf thereon when the shower corner shelf installation tool is in use, the first and second arms each having an upper sidewall connected to a lower sidewall by an outer sidewall positioned there between; (ii) anchor members protruding from the outer side wall of each arm, the anchor members configured to grip a shower corner to temporarily affix the shower corner shelf installation tool thereto while in use; (iii) leveling members extending above the first and second arm that are independently configured to selectively adjust the shower corner shelf during installation; and (iv) a tensioning member configured to extend between the first and second arm and apply force to the first and second arms and anchor members while the shower corner shelf installation tool is in use to temporarily affix the shower corner shelf installation tool to shower corner.

In certain aspects, the kit further includes an adhesive for adhering the shower corner shelf to a shower corner.

In certain aspects, the kit further includes pre-packaged grout for concealing edges of the corner shelf.

In certain aspects, the tensioning member of the tool in the kit is adjustable in length to selectively apply force to the first and second arms.

In certain aspects, the tensioning member of the tool in the kit is a turnbuckle having one end pivotally attached to the first arm and a second end configured to move towards the second arm and to be temporarily received within a catch member of the second arm when the turnbuckle is deployed, the turnbuckle configured to adjust in length while deployed to concurrently, selectively apply force to the first and second arms and anchor members while the shower corner shelf installation tool is in use to temporarily affix the shower corner shelf installation tool to the shower corner.

In certain aspects, the first arm of the tool in the kit has a channel formed between the upper, lower, and outer sidewalls that is configured to receive the turnbuckle therein when the turnbuckle is in a stowed position.

In certain aspects, the leveling members of the tool in the kit are adjacent to the anchor members.

In certain aspects, the leveling members of the tool in the kit extend through and are selectively adjustable above and below the upper and lower sidewalls of the first and second arms.

In certain aspects, the leveling members of the tool in the kit are transversely oriented within the upper and lower sidewalls relative to the anchor members.

In certain aspects, the first and second arms of the tool in the kit are pivotally connected to one another by a hinge.

In addition, the tool disclosed herein may be used for installing a shelf or shelves in corners other than shower corners (e.g., plaster walls or drywall surfaces). In this aspect and also disclosed is a corner shelf installation tool including a first and second arm that are pivotally connected to one other and are configured to support a corner shelf thereon when the corner shelf installation tool is in use, the first and second arms each have an upper sidewall connected to a lower sidewall by an outer sidewall positioned therebetween; spaced apart anchor members protruding away from the outer side wall of each arm that are configured to grip a wall corner to temporarily affix the corner shelf installation tool thereto while in use; spaced apart leveling members extending above the first and second arm that are independently configured to selectively adjust the corner shelf during installation; and a tensioning member configured to extend between the first and second arm and to apply force to the first and second arms and anchor members while the corner shelf installation tool is in use to temporarily affix the corner shelf installation tool to the wall corner.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

FIGS. 1-3, 10, and 11 depict various views of the shower corner shelf installation tool 100 (also referred to as "tool" herein). As further shown in FIG. 10, the tool 100 may be deployed while in use, or as further shown in FIG. 11, may be in a stowed state while not in use.

Figure 1:
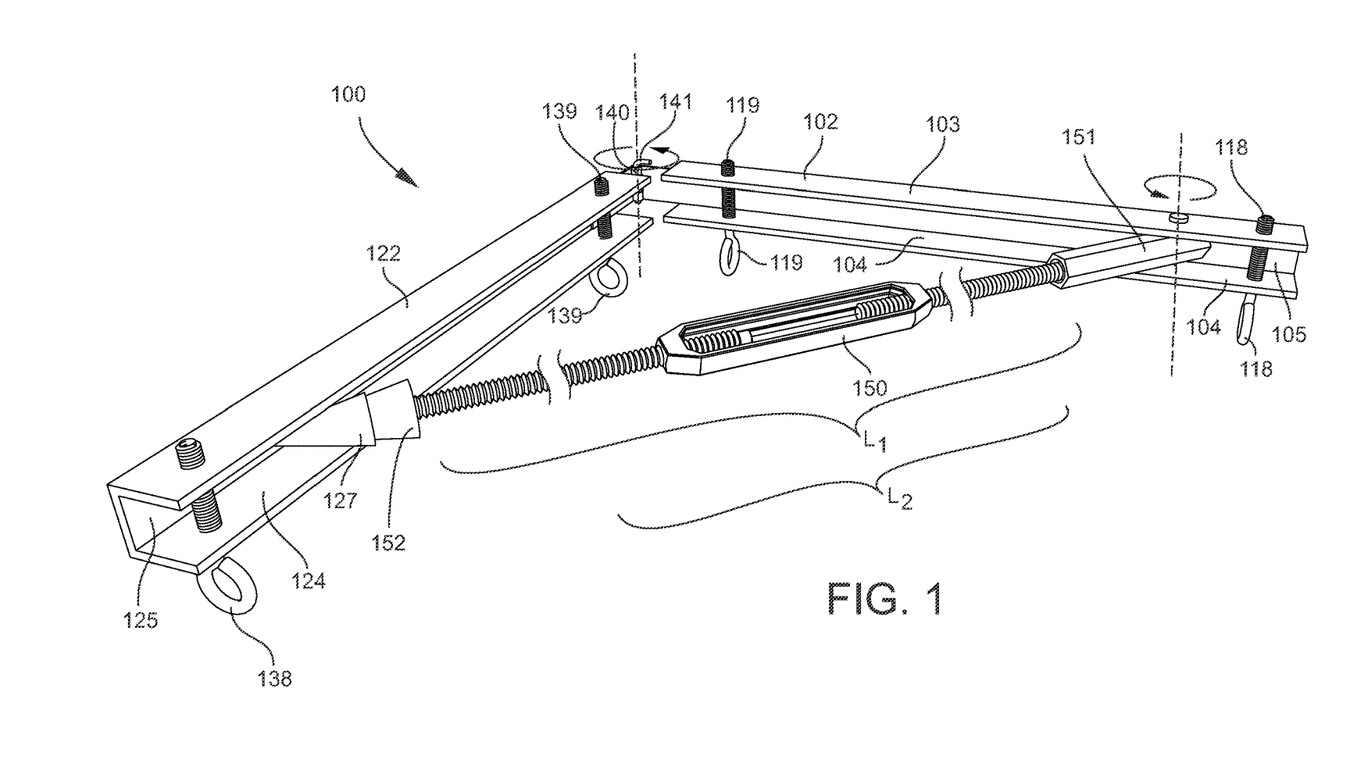
FIG. 1 is a perspective view of the corner shelf installation tool in a deployed configuration/state.
Figure 2:
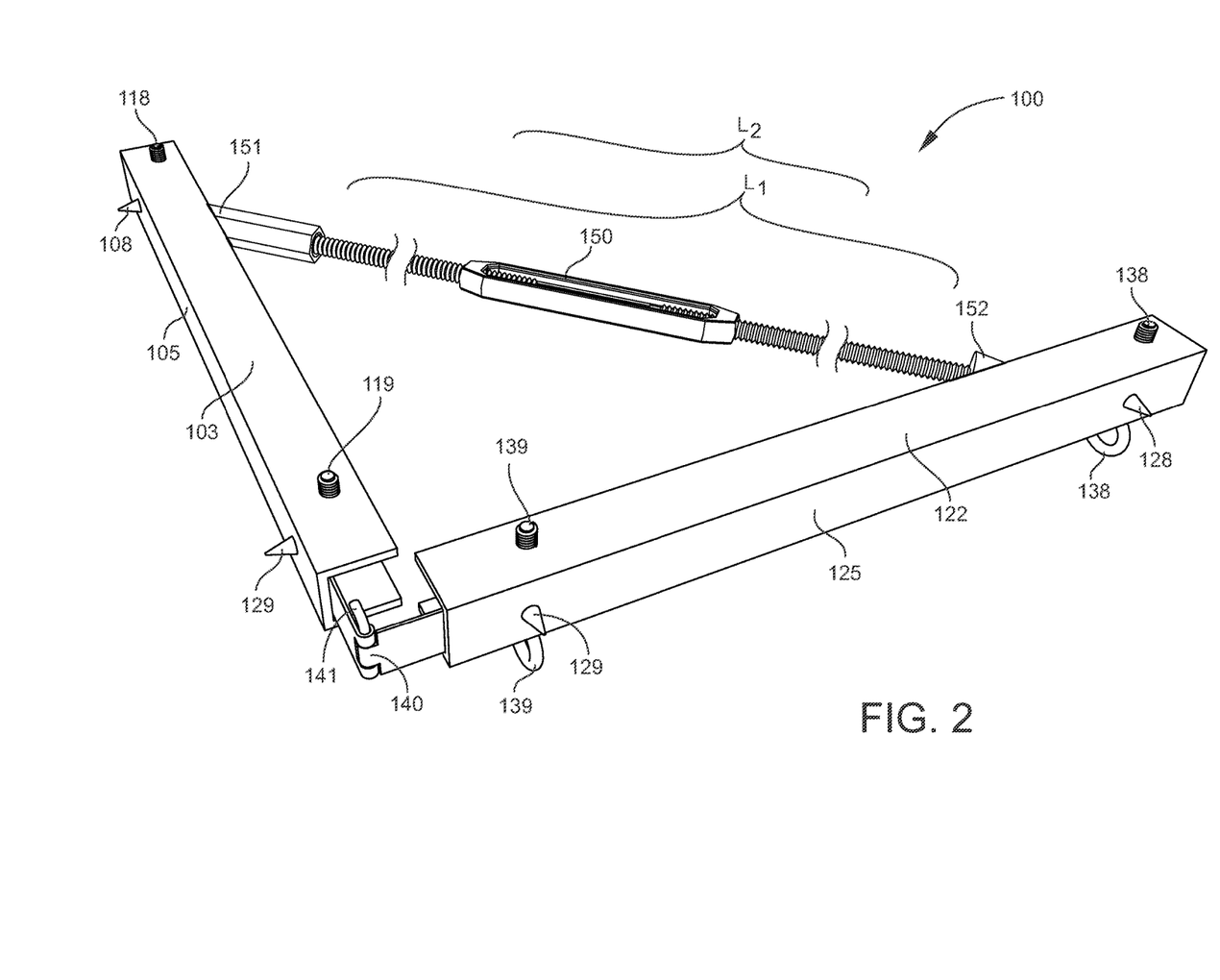
FIG. 2 is a back perspective view of the corner shelf installation tool in a deployed configuration/state.
Figure 3:
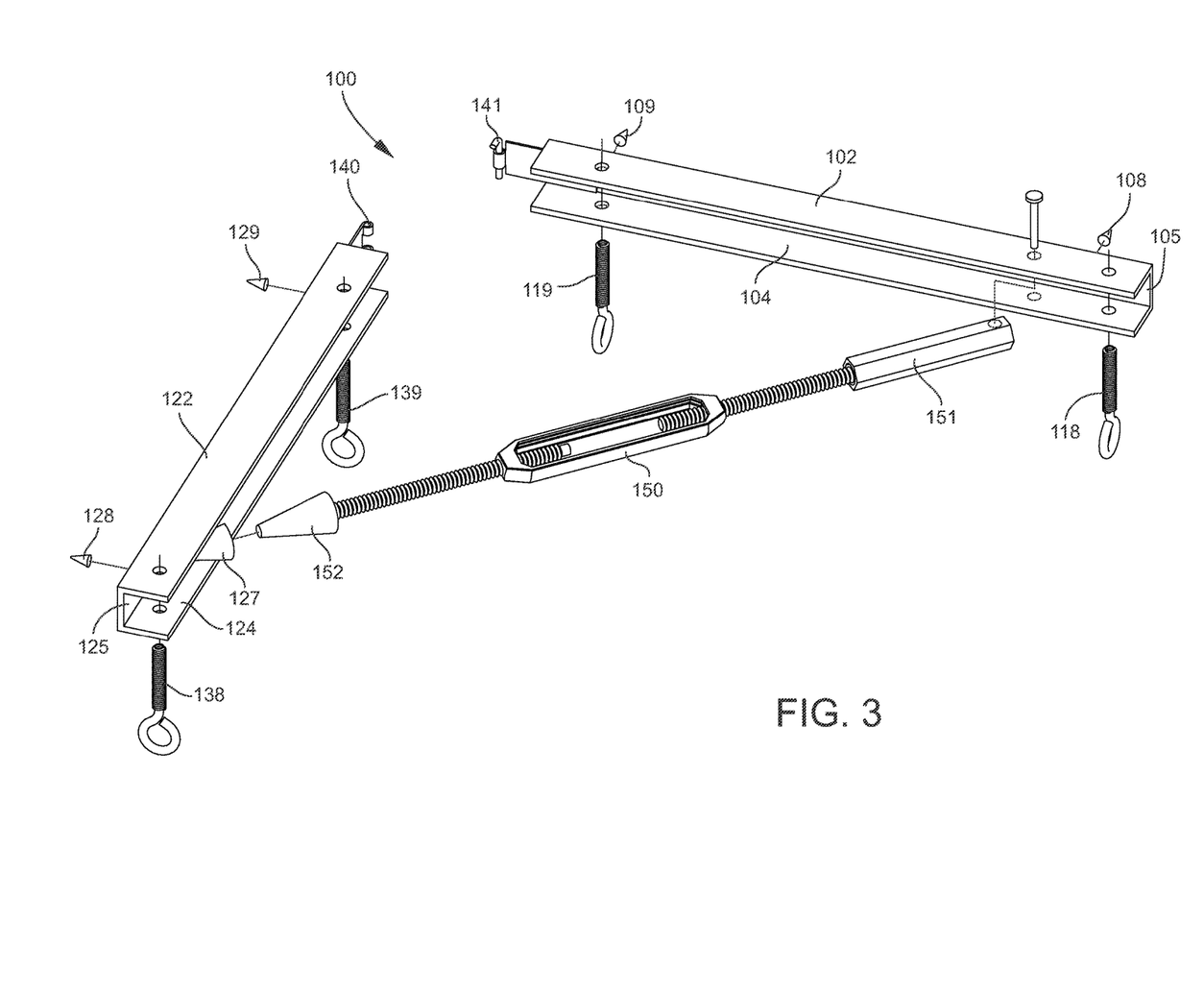
FIG. 3 is an exploded view of the corner shelf installation tool.

As shown in the sequential views of FIGS. 4-6 and as discussed in greater detail below, the tool 100 may be used for corner shelf 300 installation in a shower corner 202 (e.g., tile and grout surfaces) or in the corner of a surface comprised of plaster or drywall (not shown). As shown in FIGS. 1-3, the tool 100 includes a first and second arm 102, 122 that are pivotally connected to one other by, for example, hinge 140 and pin 141, which allow each arm to selectively rotate towards or away from the other arm. In certain aspects, the arms are configured to rotate away from each other thereby obtaining an angle of up to 120°, up to 110°, or up to 100° of the tool, in which the angle of the tool substantially corresponds to the angle of the corner (e.g., corner 201 in FIGS. 4-6) that the tool is being affixed to.

Each arm 102, 122 (respectively) is formed of rigid, non-deformable walls having sufficient strength to support a corner shelf (e.g., 300 in FIG. 6) thereon during installation of the shelf on the desired corner surface. More particularly, each arm 102, 122 has an upper sidewall 103, 123 (respectively) connected to a lower sidewall 104, 124 (respectively) by an outer sidewall 105, 125 (respectively) positioned there between. In certain aspects, the outer sidewalls 105, 125 are substantially planar such that the outer sidewalls 105, 125 of the tool 100 are substantially parallel to, and in certain aspects substantially flush, with the walls that form the shower corner 201 (or other corner surface) when the tool is in use and the tool is temporarily affixed to, for example, a shower corner. Likewise, in certain aspects the upper sidewalls 103, 123 are substantially planar to provide a level surface on which the corner shelf 300 may be placed during installation. As further shown in FIGS. 1-3, the upper, lower, and outer sidewalls of each arm 102, 122 form channels or recessed portions within each respective arm, with each channel being configured to receive and/or conceal other tool features (e.g., tensioning member 150 and/or catch member 127) therein.

As shown in FIGS. 2 and 3, the tool 100 also includes spaced apart anchor members 108, 109, 128, 129 positioned on each respective arm that protrude away from the outer side wall 105, 125 of each arm 102, 122. When the tool 100 is deployed within, for example, a shower corner and when force is being applied thereto by tensioning member 150 (discussed in detail further below), the anchor members 108, 109, 128, 129 grip the shower corner to temporarily affix the shower corner shelf installation tool 100 thereto while in use. The anchor members 108, 109, 128, 129 are formed of a rigid/non-deformable material and have either a blunt end shape or pointed end shape. In certain aspects, pointed ends may be preferred in tool 100 due to enhanced overall gripping strength achieved by the anchor members on a tile and/or grout surface while in use in a shower corner. However, in certain instances, the above mentioned pointed ends may create small, undesirable indentations within the tile and/or grout. Although these small indentations are partially concealed once the corner shelf is installed and are not readily observable post-installation of the corner shelf in the desired corner, a user may in some instances find these indentations to be undesirable and will therefore prefer using a tool 100 with blunt ended anchor members (not shown) versus the pointed anchor members to potentially avoid formation of these small indentation during installation of the corner shelf.

As further shown in FIGS. 1-3, the tool 100 further includes spaced apart leveling members 118, 119, 138, 139 extending above the first and second arm 102, 122 that are independently configured to selectively adjust the shower corner shelf during installation. As further shown in FIG. 3, the first and second arms 102, 122 have aligned through holes on each of their respective upper and lower sidewalls 103, 104, 123, and 124 that receive a leveling member 118, 119, 138, 139 there through. As further shown in FIG. 7, each leveling member 118, 119, 138, 139 is independently, vertically adjustable relative to the upper and lower sidewalls 103, 104, 123, 124, which allows the user to independently adjust each leveling member to a desired amount above the respective upper sidewall 103, 123 and/or to a desired amount below the respective lower sidewall 104, 124. As further shown in FIG. 7, each leveling member 118, 119, 138, 139 may be adjusted to achieve the desired positioning of the shelf 300 placed thereon, and a user may further use a level 400 in order to achieve the desired shelf positioning and pitch while installing the shelf within the desired corner. In certain aspects, the leveling members 118, 119, 138, 139 are screws threadedly engaged with the aligned through holes in the upper 103, 123 and lower sidewalls 104, 124 of each arm, and the height of each leveling member may be adjusted above the respective upper wall by advancing the screw through the through hole in the desired direction.

Figure 10:
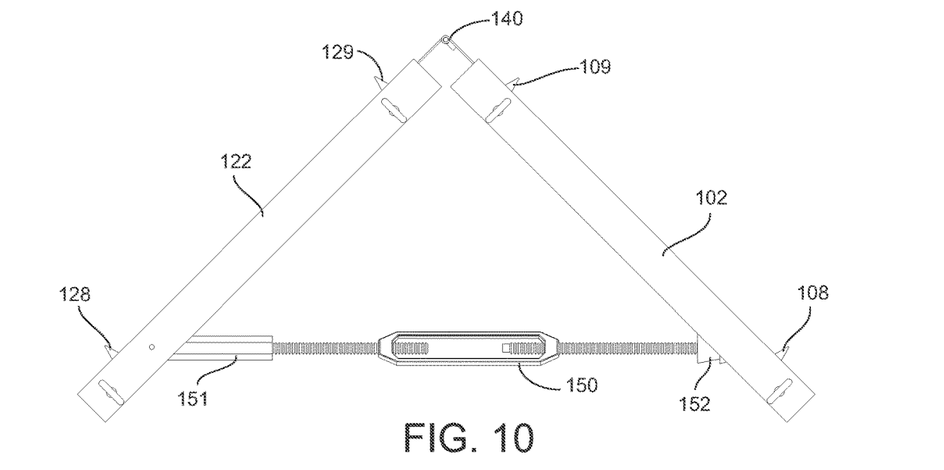
FIG. 10 depicts the tool in a deployed configuration/state.
Figure 11:
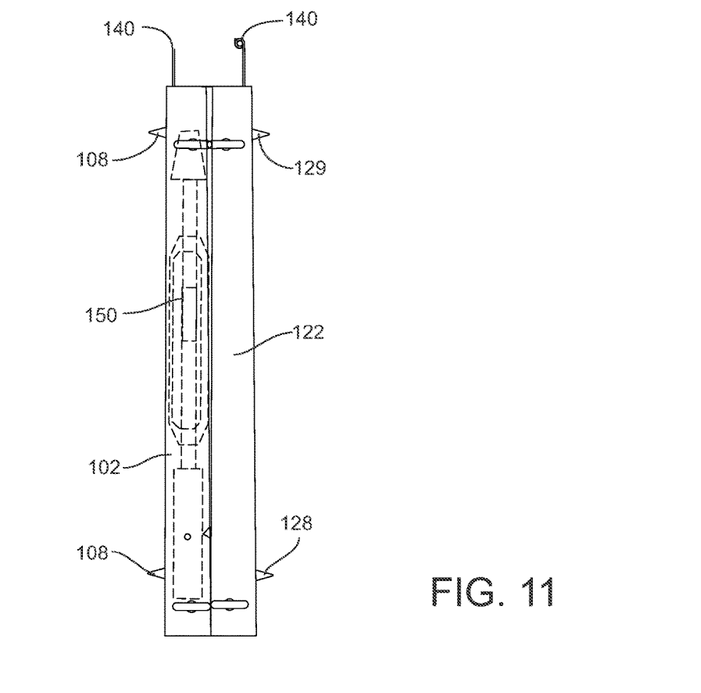
FIG. 11 depicts the tool in a stowed configuration/state.

The tool 100 further includes a tensioning member 150 having adjustable lengths, $L_1$ (extended length) and $L_2$ (retracted/shortened length), which aids in applying force to the arms 102, 122 and anchor members 108, 109, 128, 129 when affixing the tool in the desired corner in order to subsequently install a shelf thereon. As shown in FIGS. 1-5, while the tool 100 is in use and when the tensioning member 150 is deployed, tensioning member 150 extends between the first and second arm 102, 122 and is configured to apply force to the first and second arms 102, 122 and anchor members 108, 109, 128, 129 by selectively extending its length ($L_1$) while the shower corner shelf installation tool is in use thereby biasing the arms 102, 122 away from one another towards the shower corner and thereby temporarily affixing the shower corner shelf installation tool to the shower corner. More specifically, the tensioning member 150 is a turnbuckle having one end 151 pivotally attached to the first arm 102 and a second end 152 (e.g., a free end) configured to move away from the first arm and towards the second arm 122. The second end 152 is temporarily received within a catch member 127 of the second arm 122 when the turnbuckle is deployed (e.g., $L_1$, extended length). The turnbuckle may be subsequently adjusted in length to concurrently and selectively apply force to the first and second arms 102, 122 and anchor members 108, 109, 128, 129 to bias the first and second arms 102, 122 away from one another and to temporarily affix the shower corner shelf installation tool to the shower corner. FIG. 10 depicts the tensioning member 150 being deployed and received within catch member 127 while FIG. 11 depicts the tensioning member in a non-deployed state—being stowed within the channel of the first arm 102.

Figure 4:
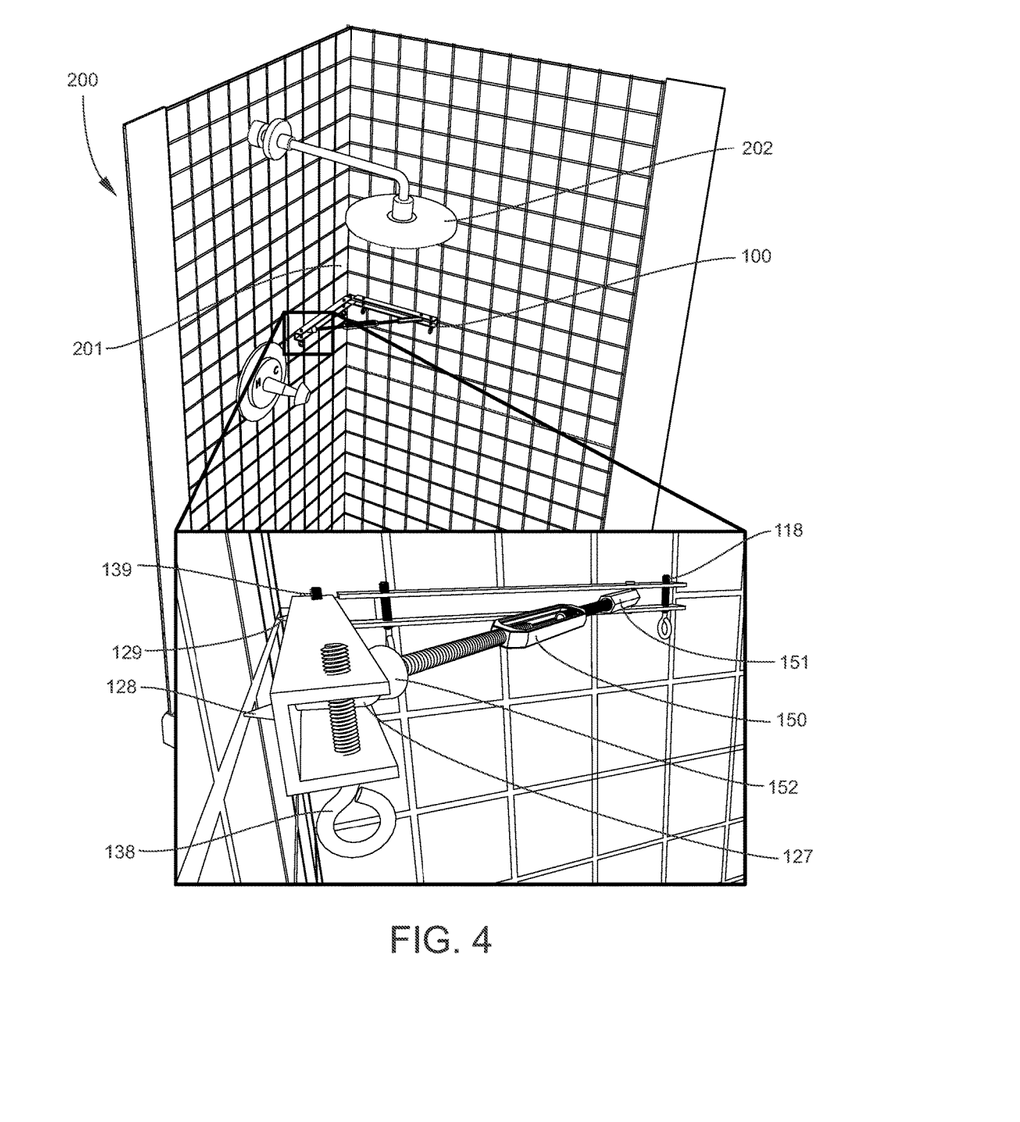
FIG. 4 is an environmental view of the tool in the process of being temporarily affixed to a shower corner in order to subsequently install a shower corner shelf.

FIGS. 4-9 sequentially depict tool 100 in use while installing a corner shelf 300 within, for example, shower 200 and desired shower corner 201. Specifically, FIG. 4 is an environmental view of a shower 200 including a shower corner 201 and shower head 202. As further shown in FIG. 4, the deployed tool 100 is initially inserted/fitted in shower corner 201. As further shown in FIG. 4, in certain instances, the anchor members may be aligned and contacted with grout (or tile) of the shower corner 201.

Figure 5:
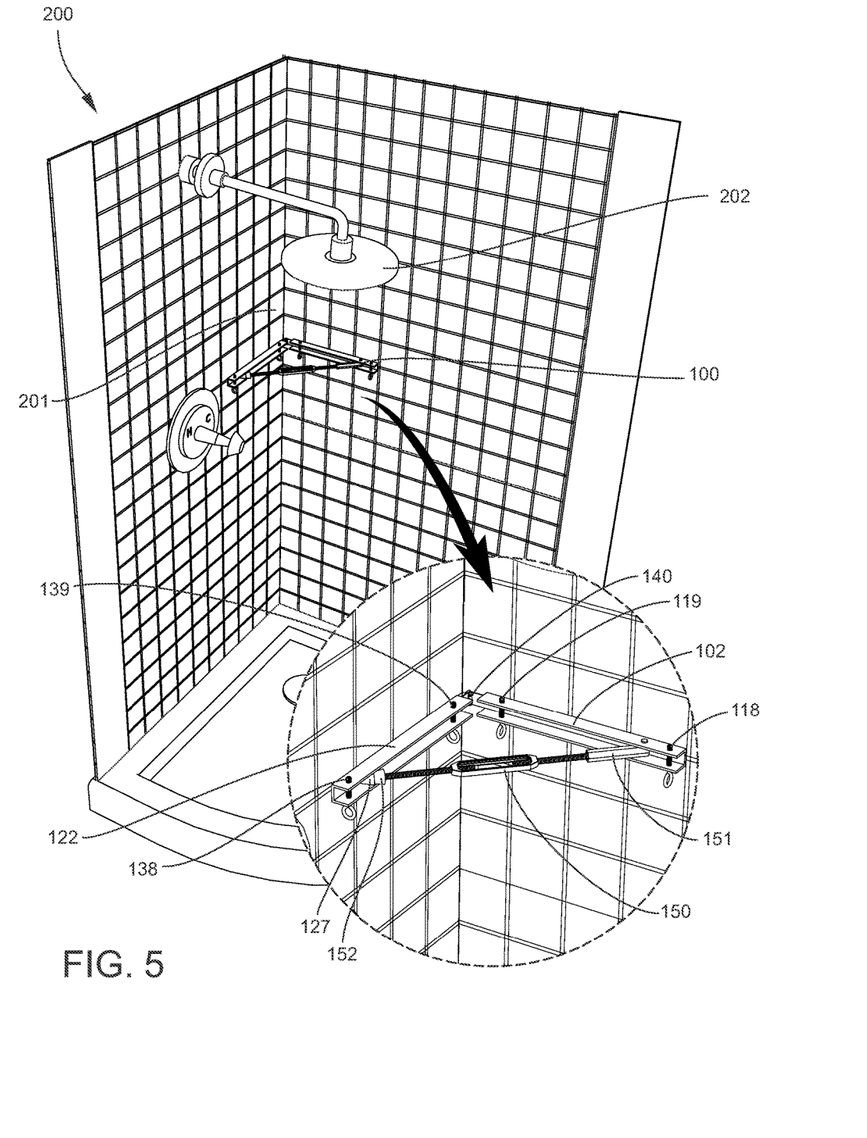
FIG. 5 is an environmental view of the tool after being temporarily affixed to a shower corner but prior to installation of a shower corner shelf thereon.

Next and as further shown in FIG. 5, the deployed tool may be affixed in the shower corner 201 by adjusting the length of tensioning member 150 (e.g., rotating a turnbuckle clockwise) to selectively apply force to the first and second arm 102, 122 and the anchor members 108, 109, 128, 129 to affix the deployed tool in the shower corner 201.

Figure 6:
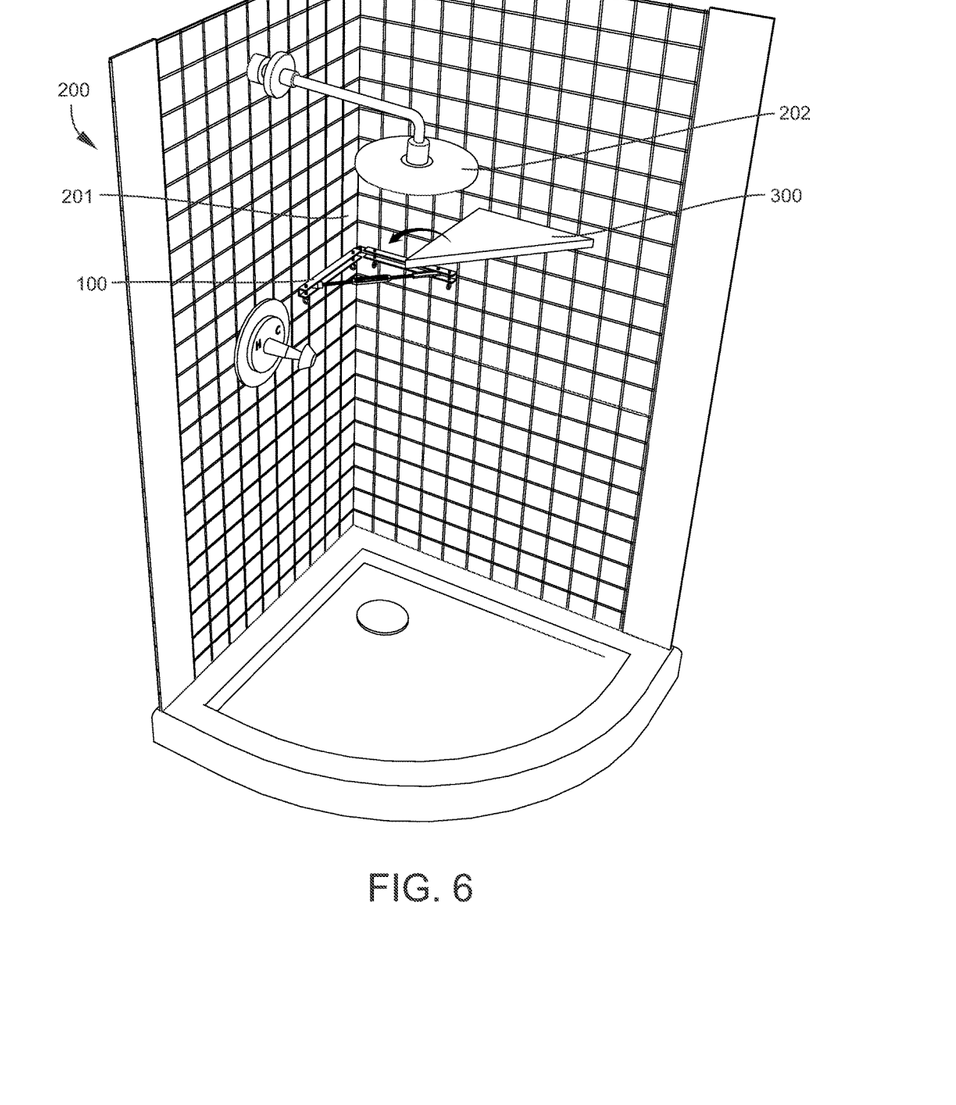
FIG. 6 is a view of a shower corner shelf being positioned over the affixed tool during installation of the corner shelf.
Figure 7:
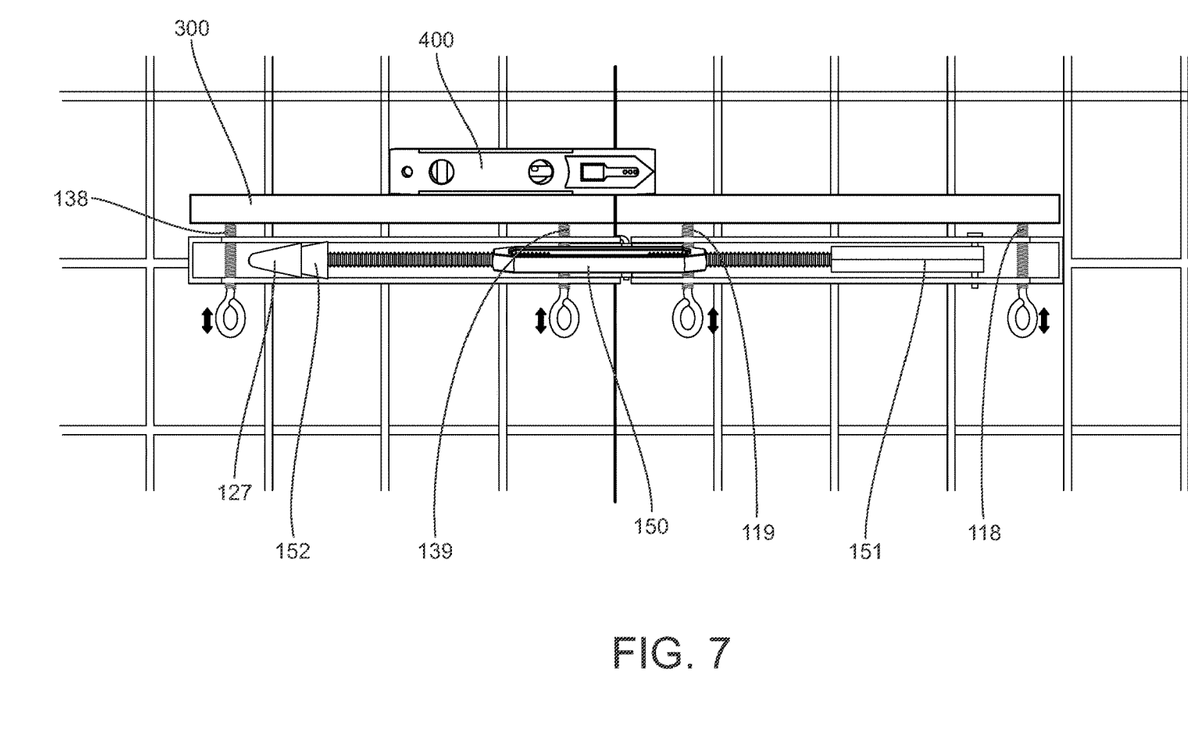
FIG. 7 depicts adjusting (e.g., leveling) the corner shelf with the leveling members while the corner shelf is positioned on and supported by the tool affixed to the shower corner.

Next and as further shown in FIGS. 6 and 7, a shower corner shelf 300 may be positioned over and supported on upper sidewalls 103, 123 of the tool 100. As further shown in FIG. 7, shelf 300, which is supported on the tool 100, may then be adjusted using the leveling members 118, 119, 138, 139 (and level 400 if desired) to obtain the desired positioning and pitch of the shelf 300 relative to the corner/shower corner 201.

Figure 8:
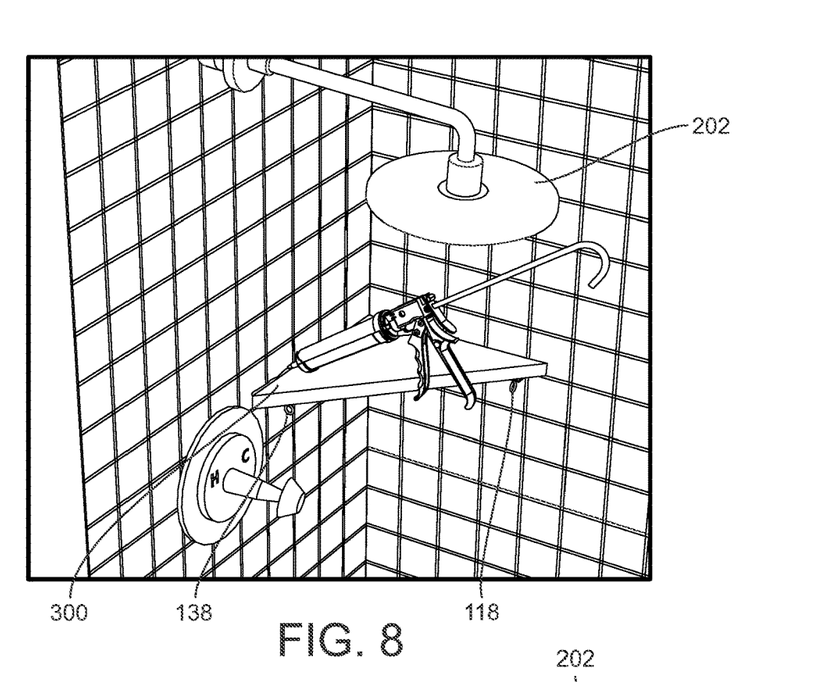
FIG. 8 depicts adhering the corner shelf to the shower corner while the shelf is still positioned on and supported by the tool.
Figure 9:
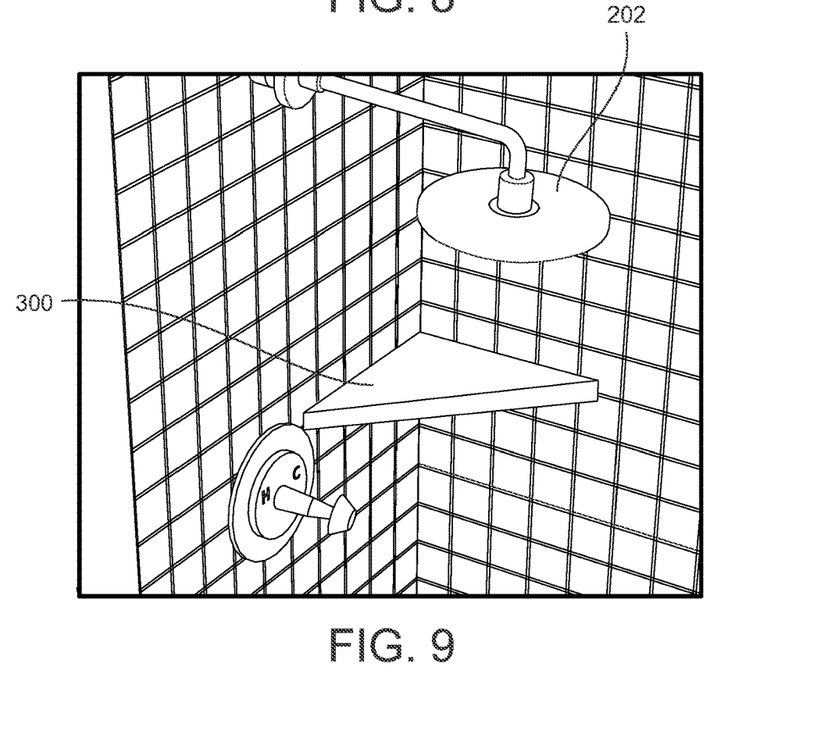
FIG. 9 depicts the corner shelf post-installation to the shower corner with the tool being removed from underneath the corner shelf.

After obtaining the desired positioning and pitch of the shelf 300 supported by the tool 100 relative to the corner 201, FIG. 8 depicts adhering, with adhesive, the corner shelf to the shower corner. After adhering the corner shelf 300 to the shower corner 201, decorative grout may be applied to conceal the edges of the shelf adjacent the shower corner to provide a more aesthetically pleasing appearance. FIG. 9 depicts the corner shelf post-installation in the shower corner and being affixed thereto with the tool being removed from underneath the corner shelf and the newly installed shelf is then ready for use.

In certain aspects, the tool 100 may be prepackaged in a kit that further includes shelf 300. This kit may further include adhesive for adhering the shower corner shelf to a shower corner and/or grout for concealing edges of the corner shelf.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A shower corner shelf installation tool comprising:
   (a) pivotally connected arms that are configured to support a shower corner shelf thereon when the shower corner shelf installation tool is in use, each arm having upper and lower sidewalls with an outer sidewall positioned there between;
   (b) spaced apart anchor members protruding away from the outer side wall of each arm that are configured to grip a shower corner to temporarily affix the shower corner shelf installation tool thereto while in use;
   (c) one or more leveling members extending above at least one arm, the one or more leveling members configured to selectively adjust the shower corner shelf during installation; and
   (d) a tensioning member configured to extend between the pivotally connected arms and to apply force to the arms and anchor members while the shower corner shelf installation tool is in use to temporarily affix the shower corner shelf installation tool to the shower corner.

2. The shower corner shelf installation tool of claim 1, wherein the tensioning member is adjustable in length to selectively apply force to the pivotally connected arms.

3. The shower corner shelf installation tool of claim 1, wherein one end of the tensioning member is pivotally attached to one arm of the pivotally connected arms and a second end of the tensioning member is configured to move towards another arm of the pivotally connected arms and to be temporarily received within a catch member of the another arm of the pivotally connected arms when the tensioning member is deployed, the tensioning member is configured to adjust in length while deployed to selectively apply force to the arms and anchor members while the shower corner shelf installation tool is in use to temporarily affix the shower corner shelf installation tool to the shower corner.

4. The shower corner shelf installation tool of claim 3, wherein the tensioning member resides within one of the arms when in a stowed position.

5. The shower corner shelf installation tool of claim 4, wherein the tensioning member is a turnbuckle.

6. The shower corner shelf installation tool of claim 1, wherein the tool includes a plurality of leveling members, with each leveling member being adjacent to the anchor members.

7. The shower corner shelf installation tool of claim 6, wherein each leveling member is selectively adjustable above and below the upper sidewalls of the pivotally connected arms.

8. The shower corner shelf installation tool of claim 7, wherein the leveling members are transversely oriented within the upper and lower sidewalls relative to the anchor members.

9. The shower corner shelf installation tool of claim 1, wherein the first and second arms are pivotally connected by a hinge.

10. A corner shelf installation kit comprising:
    (a) a corner shelf; and
    (b) a corner shelf installation tool, wherein the corner shelf installation tool comprises:
        (i) a first and second arm that are pivotally connected to one other and are configured to support the corner shelf thereon when the corner shelf installation tool is in use;
        (ii) anchor members extending from each arm, the anchor members configured to grip a corner to temporarily affix the corner shelf installation tool thereto while in use;
        (iii) at least one leveling member extending above the first and/or second arm and being configured to selectively adjust the corner shelf during installation; and
        (iv) a tensioning member configured to extend between the first and second arms and apply force to the first and second arms and anchor members while the corner shelf installation tool is in use to temporarily affix the corner shelf installation tool to the corner.

11. The corner shelf installation kit of claim 10, further comprising an adhesive for adhering the corner shelf to the corner.

12. The corner shelf installation kit of claim 10, wherein the tensioning member is adjustable in length to selectively apply force to the first and second arms.

13. The corner shelf installation kit of claim 10, wherein the tensioning member is a turnbuckle having one end pivotally attached to the first arm and a second end configured to move towards the second arm and to be temporarily received within a catch member of the second arm when the turnbuckle is deployed, the turnbuckle configured to adjust in length while deployed to concurrently, selectively apply force to the first and second arms and anchor members while the corner shelf installation tool is in use to temporarily affix the corner shelf installation tool to the corner.

14. The corner shelf installation kit of claim 13, wherein the first arm has upper, lower and outer sidewalls, wherein the first arm has a channel formed between the upper, lower, and outer sidewalls that is configured to receive the turnbuckle therein when the turnbuckle is in a stowed position.

15. The corner shelf installation kit of claim 10, wherein the at least one leveling member comprises a plurality of leveling members, wherein the leveling members are adjacent to the anchor members.

16. The corner shelf installation kit of claim 15, wherein the leveling members extend through and are selectively adjustable above and below upper and lower sidewalls of the first and second arms.

17. The corner shelf installation kit of claim 16, wherein the leveling members are transversely oriented within the upper and lower sidewalls relative to the anchor members.

18. The corner shelf installation kit of claim 10, wherein the first and second arms are pivotally connected by a hinge.

19. A corner shelf installation tool comprising:
    (a) a first and second arm that are pivotally connected to one other and are configured to support a corner shelf thereon when the corner shelf installation tool is in use;
    (b) spaced apart anchor members protruding away from an outer side wall of each arm that are configured to grip a wall corner to temporarily affix the corner shelf installation tool thereto while in use;
    (c) one or more spaced apart leveling members extending above the first and second arm that are independently configured to selectively adjust the corner shelf above the tool during installation; and (d) a tensioning member configured to apply force to the first and second arms and anchor members while the corner shelf installation tool is in use to temporarily affix the corner shelf installation tool to the wall corner.

* * * * *